United States Patent [19]
Yeh

[11] Patent Number: 5,102,254
[45] Date of Patent: Apr. 7, 1992

[54] CONSTRUCTION OF PIPE FITTINGS

[76] Inventor: Kuo-Huei Yeh, 7F, No. 11, Lane 15, Chungpo N. Rd., Taipei, Taiwan

[21] Appl. No.: 710,533

[22] Filed: Jun. 5, 1991

[51] Int. Cl.⁵ .............................................. F16D 1/00
[52] U.S. Cl. .................................. 403/174; 403/297; 403/295
[58] Field of Search ................. 403/297, 295, 174, 178

[56] References Cited

U.S. PATENT DOCUMENTS

| | | | |
|---|---|---|---|
| 3,620,558 | 11/1971 | MacMillan | 403/297 X |
| 4,574,552 | 3/1986 | Korth | 403/297 X |
| 4,787,319 | 11/1988 | Dupraz | 403/297 X |
| 4,934,858 | 6/1990 | Beaulieu | 403/297 X |

FOREIGN PATENT DOCUMENTS

| | | | |
|---|---|---|---|
| 567174 | 9/1975 | Switzerland | 403/297 |
| 770335 | 3/1957 | United Kingdom | 403/297 |

Primary Examiner—Andrew V. Kundrat
Attorney, Agent, or Firm—Bacon & Thomas

[57] ABSTRACT

A fitting assembly for joining hollow pipes has a fitting having a two-piece elongated body with ends to fit within the pipes. The elongated body defines longitudinally extending inserting channels extending from one end to an intermediate portion. Once inserted into pipes, the two pieces are urged apart by a screw to lock the fitting in the pipes. A second two-piece fitting may be attached via its engagement with an inserting channel. The second fitting has a portion insertable into a pipe and may be clamped within the pipes and to the first fitting by a screw urging apart the two pieces of the second fitting.

10 Claims, 13 Drawing Sheets

CONSTRUCTION OF PIPE FITTINGS

BACKGROUND OF THE INVENTION

Display racks, cabinets, etc., used in general exhibition halls or in temporary displaying or selling places are mostly temporary works. Therefore, besides their innovative and beautiful external appearance, the most important feature of temporary racks, cabinets, etc., is that they shall be easy to install and to dismantle, so as to facilitate the construction and to minimize the construction time. Special exhibition or display sites sometimes call for long lengths or pipes, which are not possible to be prefabricated and stored in advance (because it occupies more space and has less usage). Therefore, these special length pipes are ordered on a demand basis. However, since the quantity ordered is small, the cost is relatively high, and in most cases, the order is impossible to fulfill. However, even though there are quite a lot of fitting types available on the market, their construction is not very different and, further, their assembly is rather time consuming. Also, they are not flexible enough in their applications or usages.

SUMMARY OF THE INVENTION

The improved construction of pipe fittings comprises an arbor assembly with one end of the arbor having dual-snap button pieces with a few channels, and the other end having dual-snap button pieces, equipped with a convex fastener. These two ends can be mutually assembled to constitute a quick connector for pivotally joining pipes either in one direction or in multiple directions.

DETAILED DESCRIPTION OF THE PREFERRED EMBODIMENTS

Figure 1:
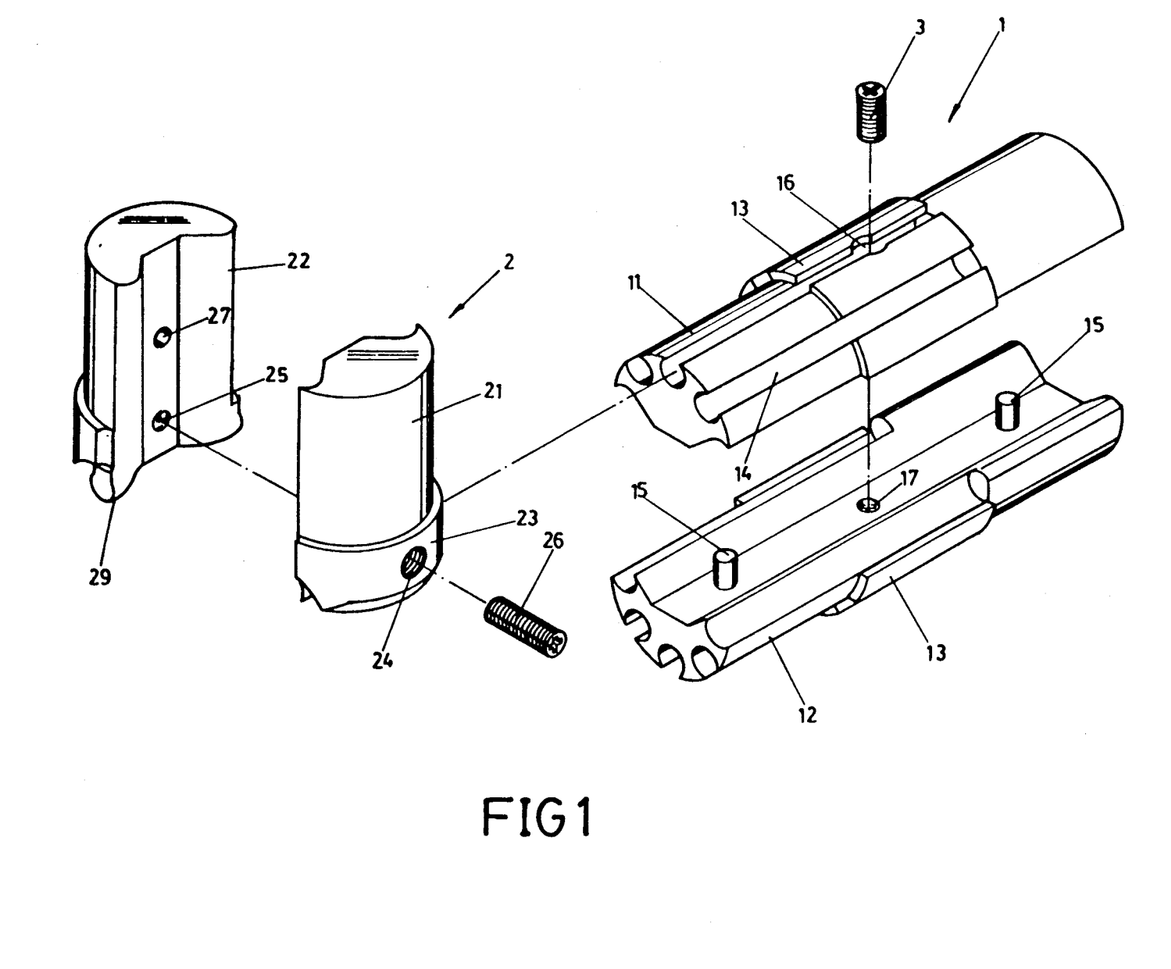
FIG. 1 is an exploded perspective view of the present invention.
Figure 2:
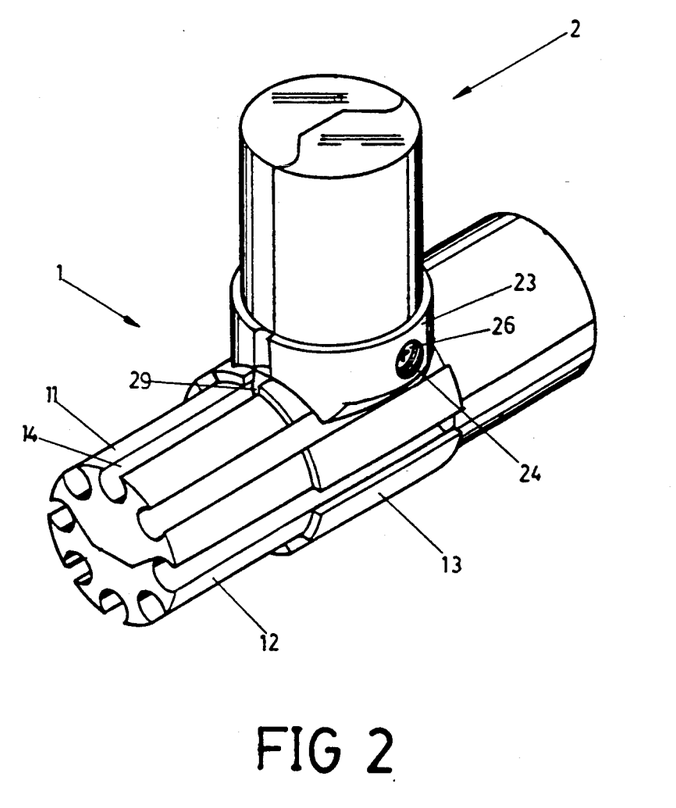
FIG. 2 is a perspective view of the invention shown in FIG. 1.
Figure 3:
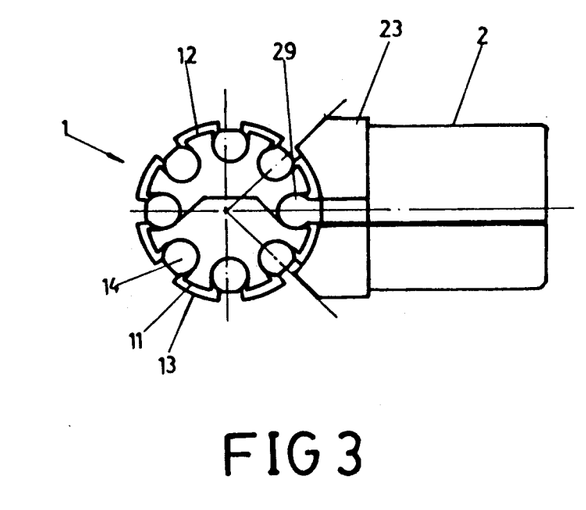
FIG. 3 is an end view of the invention shown in FIG. 2.

Please refer to the drawings shown in FIGS. 1, 2, and 3. The construction of the invention includes two pipe fitting elements (1) and (2), which are each comprised of a two-piece assembly made of dual-snap button pieces.

Fitting (1) is constructed as an elongated body by a first piece (11) and second piece (12). The center of this body forms a convex joint portion (13).

An outside surface of one end of the elongated body defines several scoop-shaped inserting channels (14). One inserting channel (14) at a location on top of the convex joint portion (13), defines a threaded hole (16).

A recess (17) is located in a corresponding position on the second piece (12).

A countersunk set screw (3) is threaded inside, through the threaded holes 16 until a screw end enters recess (17).

Figure 4:
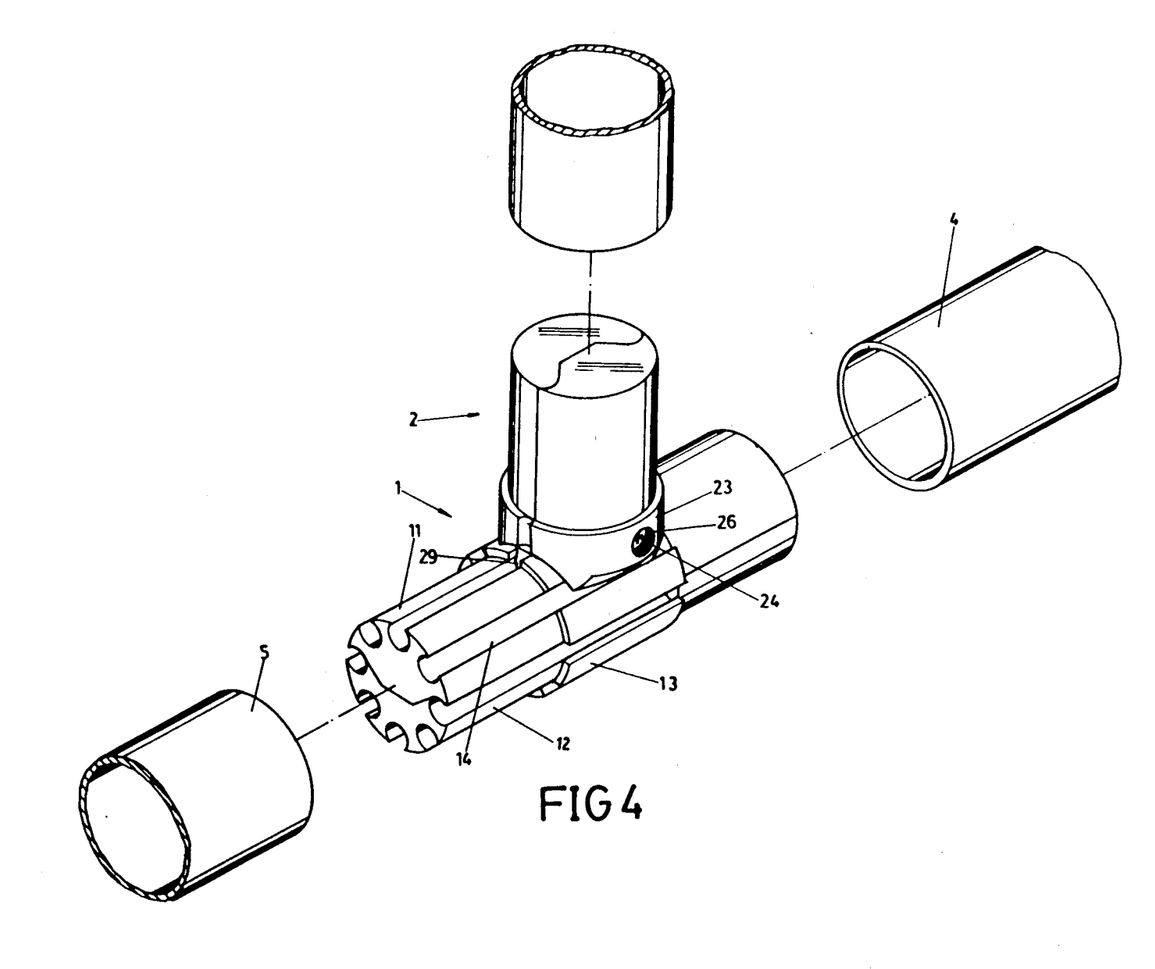
FIG. 4 is an exploded perspective view showing the assembly of the invention with a plurality of pipes.
Figure 5:
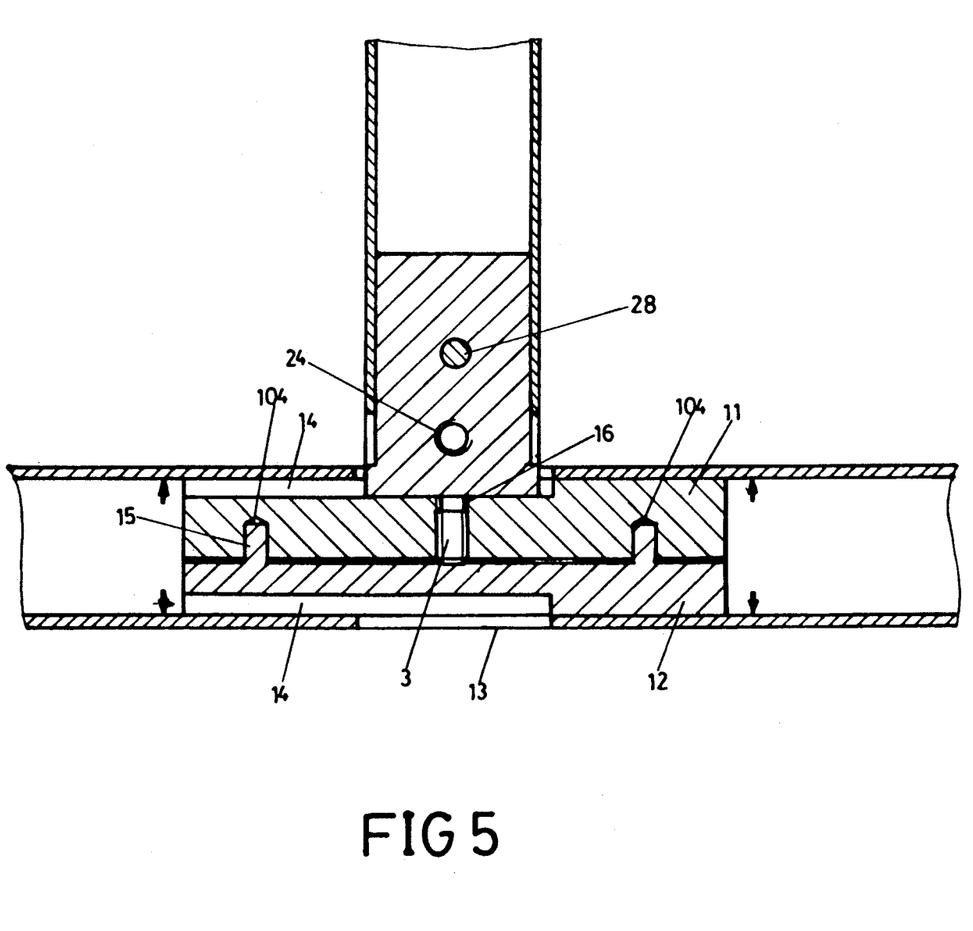
FIG. 5 is a cross-sectional view of the assembly shown in FIG. 4.
Figure 6:
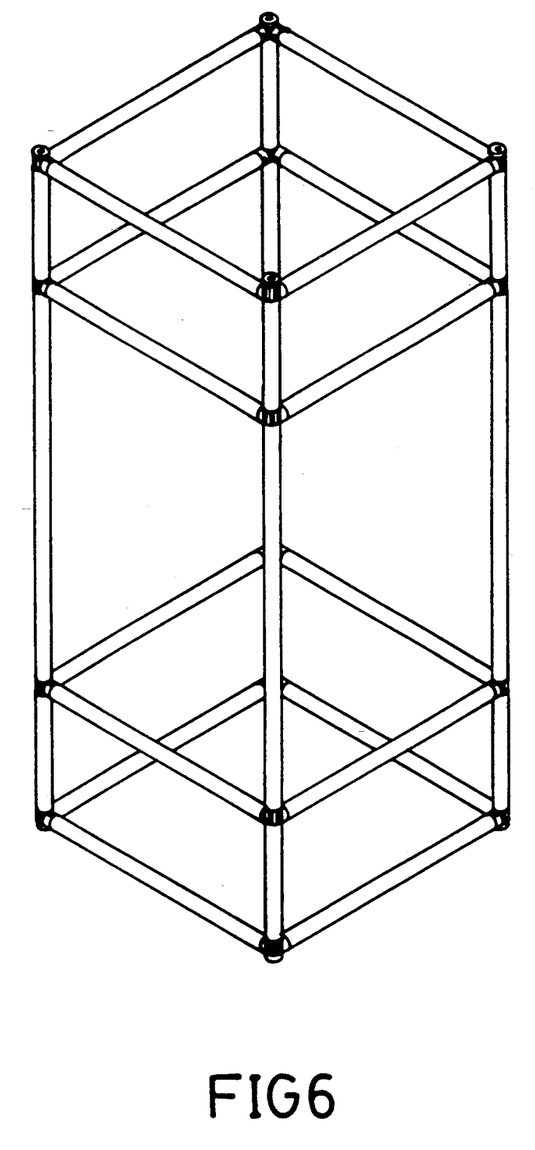
FIGS. 6 through 10 inclusive are perspective views of display racks using the present invention.
Figure 7:
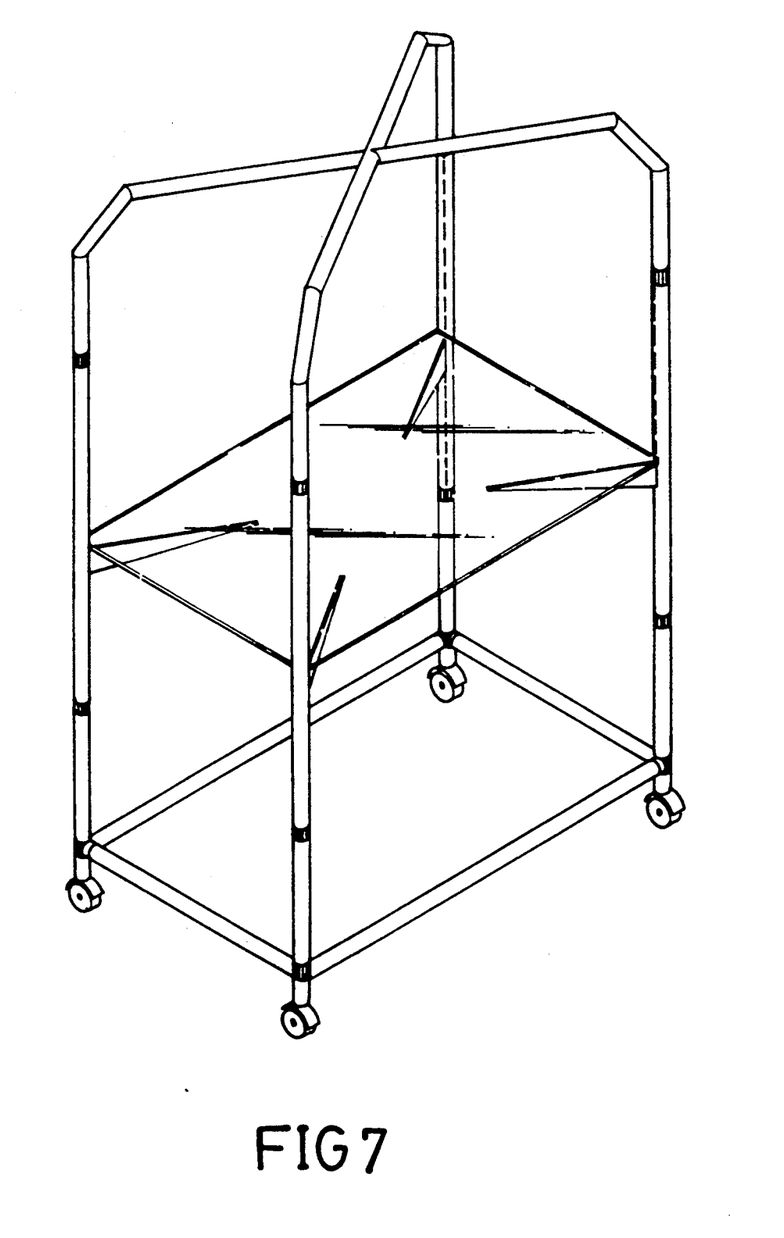
Figure 8:
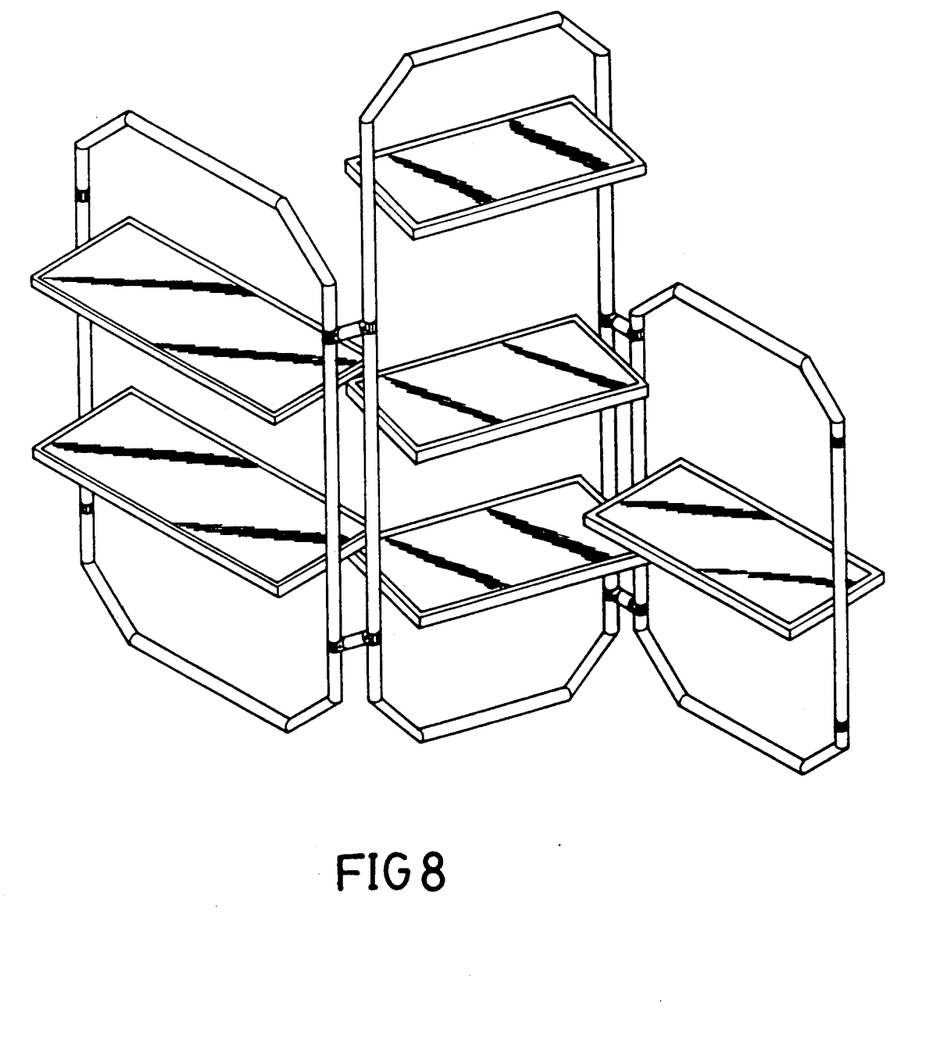
Figure 9:
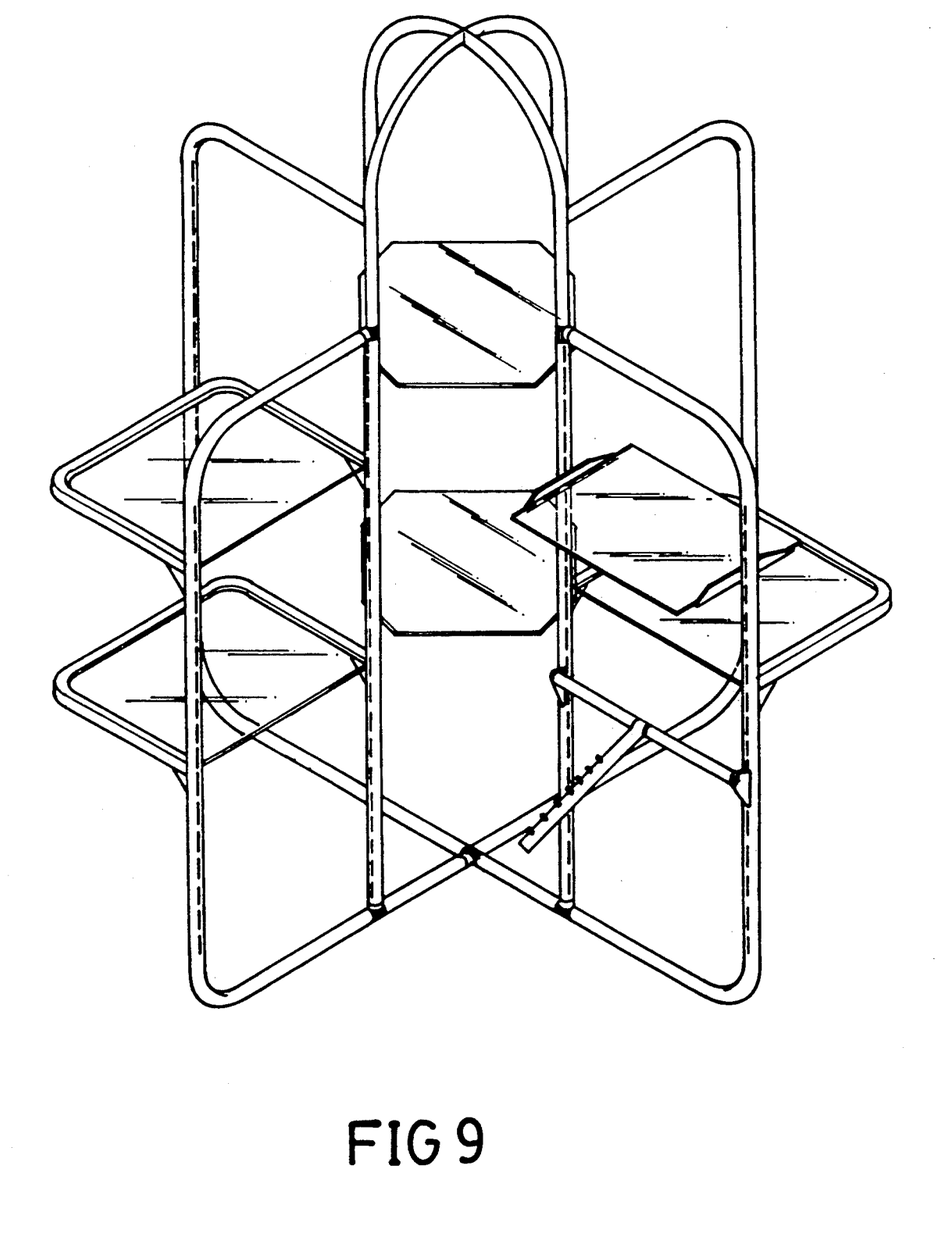
Figure 10:
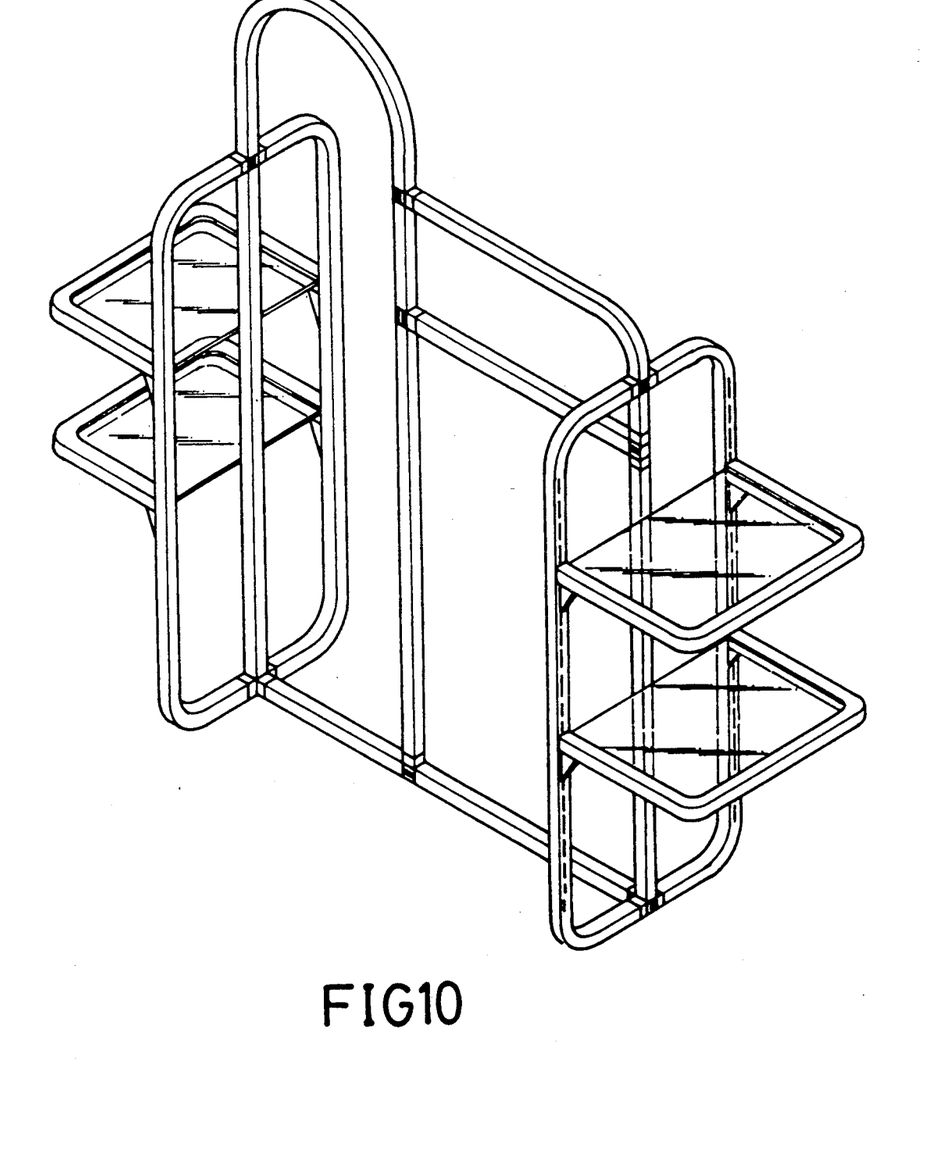

When it is desired that two pipes (4) and (5) shall be joined together, just insert both ends of the fitting (1) inside the pipes (4) and (5) (see FIGS. 4 and 5). Then the set screw (3) is screwed into the threaded hole (16) until reaching the recess (17) of the second piece 12 so that the fitting (1) and the pipes (4) and (5) are then joined tightly together.

The several scoop-shaped channels (14) on the fitting (1) are to enable a second fitting (2) to be inserted and connected by the convex fastener (29) to fitting (1), so as to form a direction and angle selectable multiple pipe fitting.

The lower end of fitting (2) defines a surface, so that the fitting (2) can seat against joint portion (13) when connecting the fitting (2) to the fitting (1). The opposite end of fitting (2) can be used as the shaft end to connect and additional pipe.

Also, on the internal surfaces of first piece (11) and second piece (12), recesses (104) and pins (15) are formed. Pins (15) can be inserted into recesses (104) during assembling, so as to properly position the first piece (11) and the second piece (12) during assembly.

The fitting (2) is also matched and assembled as an elongated body by two third and fourth pieces (21) and (22). Near one end, fitting (2) is equipped with a convex joint portion (23). Joint portion (23) of third piece, (21) define a threaded hole (24). A small recess (25) is located at a corresponding position on an inner surface of fourth piece (22). Screw (26) can be inserted through hole (24), so that the fitting (2) can also be tightly joined with a pipe.

Also, internal surfaces of third piece (21) and fourth piece (22), define a recess (27) and a pin (28), respectively, which can be mutually inserted during assembly of fitting (2), so as to properly locate third and fourth pieces (21) and (22).

End surfaces of third and fourth pieces (21) (22) of fitting (2) define a convex fastener (29), which can be inserted and assembled within the channels (14) of fitting (1), so as to form a direction and angle selectable multiple pipe fitting. The multiple pipe fitting is easy in application to a variety of uses on parts racks, panels or cabinets (as shown on in FIGS. 6, 7, 8, 9 and 10), and enables a more flexible connecting angle when assembling or connecting the pipes.

Figure 11:
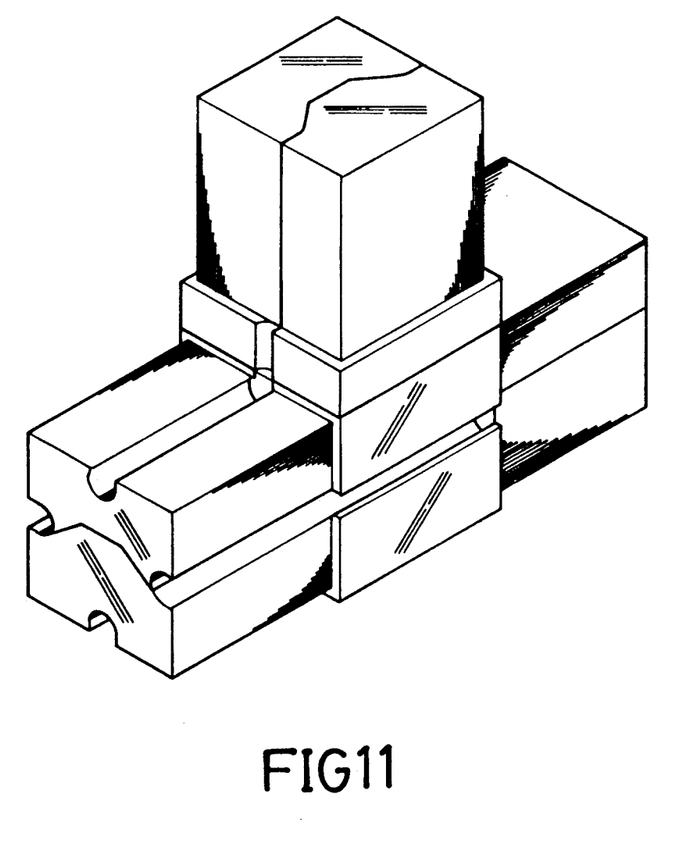
FIG. 11 is a perspective view of the invention modified to accommodate square pipes.
Figure 12:
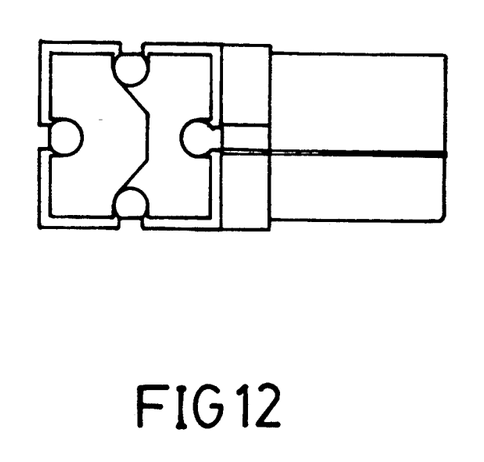
FIG. 12 is an end view of the invention shown in FIG. 11.
Figures 13, 14:
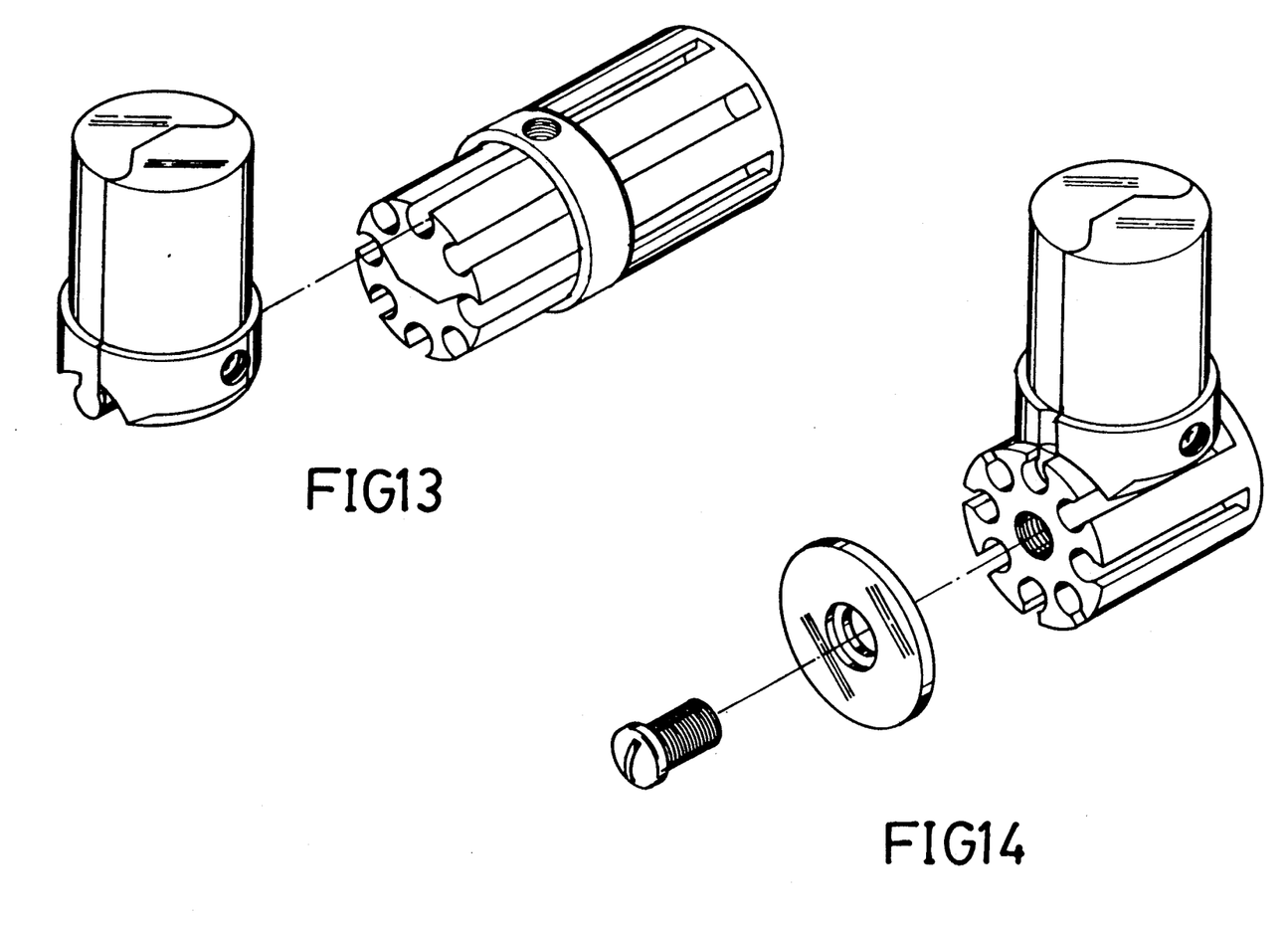
FIGS. 13 and 14 are exploded perspective views of third and fourth embodiments of the invention.

Naturally, the shape of fitting of this invention is not limited to only a circular cross-sectional shape. It can be made in square cross-sectional shape as shown in FIGS. 11 and 12. Also, the construction can be developed to applications as shown on FIGS. 13 and 14.

A major purpose of the invention is to provide a pivot jointed application to pipes either in a single direction or in multiple directions. Also, the construction of fittings allows connecting angles and directions to be varied.

What is claimed is:

1. A fitting assembly for joining a plurality of hollow pipes comprising:
   a) a first fitting having an elongated body with opposite end portions adapted to be inserted into a pipe and an intermediate joint portion, the elongated body being divided into first and second pieces;

b) locating means operatively associated between the first and second pieces adapted to align the first and second pieces;

c) a plurality of inserting channels defined by the elongated body, the channels extending in a generally longitudinal direction on the body and extending through one end portion and the intermediate portion; and, d) screw means threadingly engaged with one piece and bearing against the other piece such that rotation of the screw means urges the first and second pieces apart, thereby locking the body to the pipes after the end portions have been inserted therein.

2. The fitting assembly of claim 1 wherein the end portions are generally circular in cross-sectional configuration.

3. The fitting assembly of claim 2 wherein the plurality of inserting channels are spaced about the periphery of the end portion.

4. The fitting assembly of claim 1 wherein the end portions are generally polygonal in cross-sectional configuration.

5. The fitting assembly of claim 1 wherein the locating means comprises:

a) at least one recess defined by one of the first and second pieces; and, b) at least one pin extending from the other of the first and second pieces located so as to enter the recess when the first and second pieces are assembled.

6. The fitting assembly of claim 1 further comprising:

a) a second fitting having an end portion adapted to be inserted into a hollow pipe and a joint portion; and, b) means on the second fitting to engage one of the inserting channels defined by the elongated body of the first fitting.

7. The fitting assembly of claim 6 wherein the means on the second fitting to engage the inserting channel comprises a fastener element extending from the second fitting, the fastener element having substantially the same cross-sectional configuration as the inserting channel so as to be slidably received therein.

8. The fitting assembly of claim 6 wherein the second fitting comprises third and fourth pieces, and further comprising second locating means operatively associated between the third and fourth pieces to align the third and fourth pieces.

9. The fitting assembly of claim 8 wherein the second locating means comprises:

a) at least one second recess defined by one of the third and fourth pieces; and b) at least one second pin extending from the other of the third and fourth pieces located so as to enter the recess when the third and fourth pieces are assembled.

10. The fitting assembly of claim 8 further comprising second screw means threadingly engaged with one of the third and fourth pieces and bearing against the other of the third and fourth pieces such that rotation of the screw means urges the third and fourth pieces apart thereby locking the second fitting to the pipe and to the first fitting.

* * * * *